United States Patent [19]

Jansen, Jr.

[11] 4,109,587
[45] Aug. 29, 1978

[54] LOAD SPACER SUPPORT

[75] Inventor: Bernard George Jansen, Jr., Withamsville, Ohio

[73] Assignee: Narad, Inc., Wayne, Mich.

[21] Appl. No.: 763,043

[22] Filed: Jan. 27, 1977

[51] Int. Cl.² .................. B60P 7/14; B60P 7/16; B61D 45/00; B61D 49/00

[52] U.S. Cl. .................. 105/490; 105/367; 108/51.3; 214/10.5 R; 248/301

[58] Field of Search .......... 52/618; 105/367, 486, 105/487, 488, 489, 490; 108/51.3; 214/10.5 R; 229/14 C; 248/248, 300, 301

[56] References Cited

U.S. PATENT DOCUMENTS

| Re. 22,644 | 5/1945 | Stroben | 248/301 X |
|---|---|---|---|
| 2,905,114 | 9/1959 | Olson | 214/10.5 R X |
| 3,159,369 | 12/1964 | Wiczer | 248/301 X |
| 3,464,367 | 9/1969 | Lotter | 229/14 C X |
| 3,534,691 | 10/1970 | Carlomagno, Jr. | 105/486 |
| 3,581,675 | 6/1971 | Kauffman | 105/367 X |
| 3,823,675 | 7/1974 | Farley | 105/489 |
| 3,842,757 | 10/1974 | Kinnune, Jr. | 105/367 X |
| 3,861,538 | 1/1975 | Locke | 105/486 |
| 3,940,101 | 2/1976 | Heidelbach | 108/51.3 X |

Primary Examiner—Drayton E. Hoffman
Assistant Examiner—Howard Beltran
Attorney, Agent, or Firm—Harness, Dickey & Pierce

[57] ABSTRACT

There is disclosed herein a collapsible honeycomb load spacer and associated support means which may be fabricated from sheets of foldable material such as corrugated fiberboard. The support device comprises an elongated sheet folded so as to provide an upper vertical flange portion which may be secured to a vertical surface of a stack of freight, a lower horizontal flange portion which is inserted between stacked freight parcels and an intermediate flange portion to which the load spacer is secured and supported from. The support device is also adapted to be compactly folded along with the collapsible honeycomb structure so as to facilitate shipping and storage thereof.

10 Claims, 4 Drawing Figures

LOAD SPACER SUPPORT

BACKGROUND AND SUMMARY OF THE INVENTION

This invention relates generally to load spacing fillers and associated supporting means which enable one to suspend such fillers between stacks of freight during transportation thereby preventing shifting and possible damage to such freight and more particularly to such support devices which do not require any attachment provisions within the transporting unit itself.

Collapsible honeycomb structured load spacers are commonly used to fill gaps or spaces between stacks of freight within transporting vehicles so as to insure against shifting of the cargo during the transportation thereof. Generally, the honeycomb structure is fabricated from a plurality of strips of corrugated fiberboard material secured together at spaced apart locations in such a manner as to provide a plurality of open ended cells extending between adjacent vertical surfaces when in an expanded condition. Generally the structure will be fabricated in such a manner as to allow it to be easily collapsed into a relatively compact package for storage or shipment. Support means are generally provided at the top portion of these spacers so as to allow the force of gravity to assist in retaining the spacer in an expanded condition between adjacent verticle surfaces.

Often the transporting vehicle will not have any provisions for attaching supporting means thereto so as to allow the load spacer to be properly suspended or even if such provisions are incorporated therein, they may not be positioned in the required location. Therefore, it is desirable to provide support means integrally with the load spacer. Further, as these load spacers are suitable for repeated uses it is desirable to provide support means which may be easily removed from an operative position within the freight transporting unit without damage thereto thus enabling the support device and associated load spacer to be reinstalled between subsequent loads. It is, therefore, important that the support device be designed to allow it to be folded along with the honeycomb spacer into a compact and light weight package so as to facilitate economical return shipment and storage thereof.

Accordingly, the present invention fully meets these diverse objectives by providing a support means having a horizontally outwardly projecting flange portion which may be securely fastened to an interior horizontal wall portion of an upper cell of the honeycomb structure and is adapted to be folded along with the collapsed honeycomb structure into a light weight compact package. The support device of the present invention is suitable for use with any type of transporting unit as it requires no attachment to the vehicle itself, but rather has a lower flange which is held between the top of a lower parcel of freight and the bottom of an upper parcel of freight and an upper flange which may be secured to the vertical sidewall of the upper parcel thereby forming a horizontally extending cantilevered support for the load spacer. This support device is designed to be easily installed and removed without damage to either the parcels, the load spacer, or the support device itself. Further, the support device may be easily and inexpensively fabricated from light weight corrugated fiberboard materials such as those used to fabricate the honeycomb spacer thus minimizing the weight thereof and making return shipment economically feasible.

Additional features and advantages of the present invention will become apparent from the following description of the preferred embodiment and the appended claims taken in conjunction with the accompanying drawings.

DESCRIPTION OF THE PREFERRED EMBODIMENT

Figure 1:
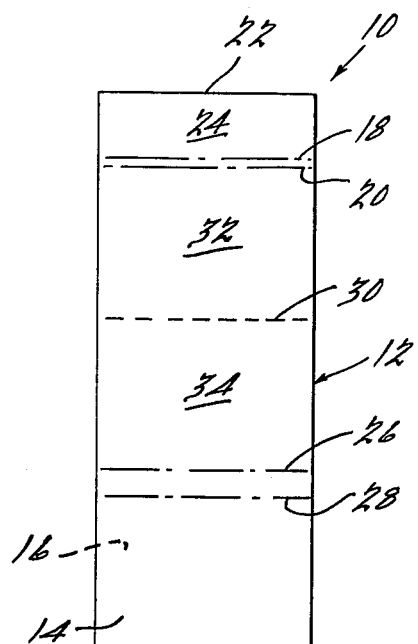
FIG. 1 is a plan view of a support device in accordance with the present invention shown flat prior to the folding thereof.

Referring now to FIG. 1 there is shown therein a load spacer support device in accordance with the present invention indicated generally at 10. Support device 10 is comprised of a generally elongated rectangular shaped sheet 12 of foldable material having a front surface 14 and a back surface 16. Preferably, support device 10 will be fabricated from a double faced corrugated fiberboard material similar to that commonly used in fabricating collapsible honeycomb load spacers. This material is ideally suited for such application in that it is light weight, inexpensive, readily available, relatively rigid, and may be easily provided with score lines which allow it to be folded into the desired shape. It will generally be desirable to fabricate support device 10 with the ribs forming the corrugation extending longitudinally so as to offer the greatest resistance to traversely extending fold lines. It should be noted, however, that while corrugated fiberboard is a preferred material, other materials may be substituted therefor, should this be desirable.

Front surface 14 of sheet 12 has a pair of slightly spaced apart substantially parallel transverse score lines 18 and 20 shaped inboard from end 22 so as to form an upper tab portion 24. A second pair of slightly spaced apart substantially parallel transverse score lines 26 and 28 are also provided on sheet 12 at a position offset slightly toward end 22 from the longitudinal center of sheet 12 and also on the front surface 14 thereof. Score lines 18, 20, 26 and 28 are grouped in pairs so as to facilitate folding of the load spacer and support device into a compact package. In order to facilitate this folding it is desirable to space score lines 26 and 28 a greater distance apart than that of score lines 18 and 20. A single transverse score line 30 is provided approximately midway between the first and second pairs of score lines 18, 20, 26 and 28 respectively, and is disposed on the back surface 16 of sheet 12, thereby forming upper and lower support flange portions 32 and 34 respectively. An additional transverse score line 36 is provided on back surface 16 of sheet 12 at a position spaced slightly inboard from end 38 of sheet 12 thereby dividing the lower portion of sheet 12 into a lower tab portion 40 and a center portion 42.

Figure 2:
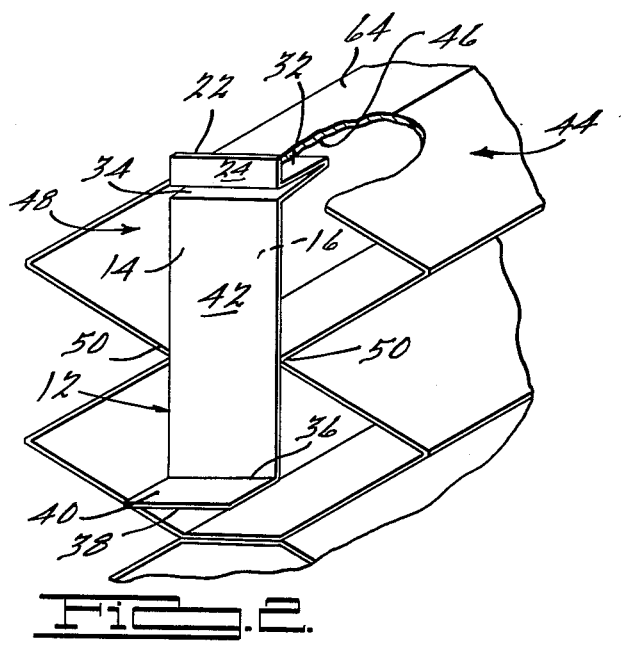
FIG. 2 is a perspective view of a support device in accordance with the present invention secured to a multicelled honeycomb load spacer device.

Sheet 12 having thus been provided with the score lines as described above, is then ready to be folded and assembled to multicell collapsible honeycomb load spacer 44 as is best seen with reference to FIG. 2. As shown therein, sheet 12 is folded along score lines 18, 20, 26, 28 and 30 in such a manner as to bring front surface 14 of portions 32 and 34 into engagement with each other thereby forming an outwardly projecting supporting flange portion. Surface 16 of upper supporting flange portion 32 may then be secured to the inner surface 46 of a cell 48 of load spacer 44 by any suitable means. Preferably, a suitable adhesive will be empoyed for this purpose.

Center portion 42 will be of a sufficient length to engage at least one lower edge 50 of cell 48 and preferably two such edges when load spacer 44 is in a fully expanded position so as to prevent center portion 42 from swinging into cell 48. Lower tab portion 40 is then folded outwardly as seen in FIG. 2 along score line 36.

Figure 3:
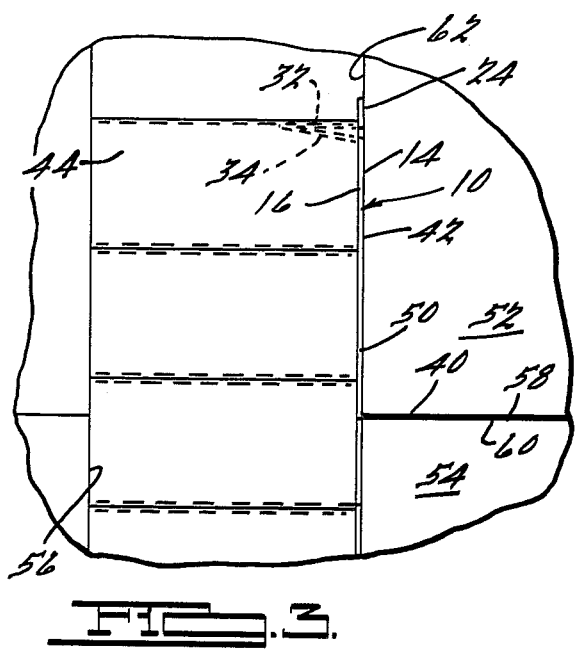
FIG. 3 is a side view of the support device of the present invention shown in operative relationship to adjacent stacks of freight.

As shown in FIG. 3, it is a relatively simple matter to install support device 10 along with the attached load spacer 44 between a stack of freight such as stacked cartons 52 and 54 and an adjacent vertical surface 56 which may be a wall portion of the transporting unit or an adjacent stack of freight. In order to accomplish this, it is first necessary to insert flange portion 40 between the top 58 of lower carton 54 and the bottom 60 of upper carton 52. This may be easily accomplished by either placing flange portion 40 on top 58 of carton 54 before carton 52 is stacked thereon or by merely tilting carton 52 a slight amount. Once lower flange portion 40 has been inserted, portion 24, which forms an upper flange portion, may then be secured to the vertical surface 62 of carton 52 by any suitable means such as for example, by taping. Preferably, surface 14 of tab portion 24 will be provided with a strip or coating of pressure sensitive adhesive material having a protective coating thereover which need merely be peeled off and tab portion 24 pressed against vertical surface 62 to secure it thereto. In reuse, it may be desirable to secure tab portion 24 to surface 62 by taping. With support device 10 secured in position, load spacer 44 will hang downwardly in an expanded position under the force of gravity thereby filling the space between adjacent surfaces 56 and 62 so as to prevent shifting of cartons 52 and 54 during shipping.

Thus, as is apparent, support device 10 affords an economical and efficient means for suspending a load spacer between any vertical surface and an adjacent stack of cartons which may be easily and rapidly installed or removed and requires no special attachment provisions within the transporting unit or on the cartons themselves. Further, the support device is adapted to be fabricated from corrugated fiberboard which allows an extremely light weight and low cost construction while still providing sufficient functional strength and rigidity. This is a significant factor in making return shipment of the device economically feasible.

Figure 4:
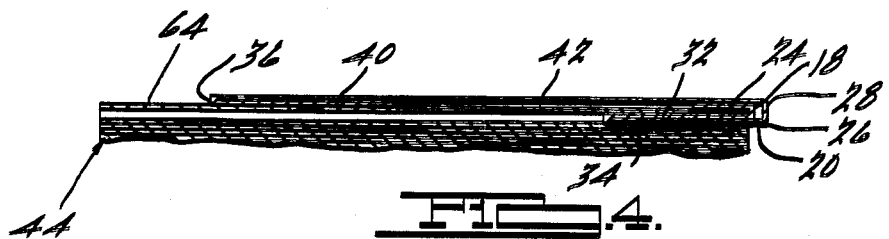
FIG. 4 is an edge view of the support device of the present invention shown in relationship to a portion of a honeycomb load spacer device both of which are folded into a compact package such as for storage or shipment.

The present invention is also uniquely designed to facilitate packaging for return shipment and/or storage along with the load spacer. As shown in FIG. 4, once load spacer 44 and support device 10 have been removed, they may be easily folded into a compact package by first merely collapsing load spacer device 44 in a conventional manner. Next, tab portion 24 is folded along score lines 18 and 20 so as to overlie the top portion 64 of load spacer device 44. Center portion 42 is then folded along score lines 26 and 28 so as to also overlie top portion 64 with lower flange portion 40 folded so as to lie therebetween. As previously mentioned, score lines 18 and 20 are spaced apart a sufficient distance so as to accommodate the thickness of top portion 64 of load spacer 44 between tab portion 24 and upper flange portion 32. Score lines 26 and 28 are spaced apart a greater distance than score lines 18 and 20 so as to accommodate the thickness of tab portion 24, top portion 64, and upper support flange portion 32 between center portion 42 and lower flange 34. This ability to be folded into a compact package allows for efficient space utilization both in return shipment thereby promoting the recycling of such devices for reuse as well as in storage thereby minimizing warehousing space requirements.

While it is apparent that the preferred embodiment of the invention disclosed herein is well calculated to afford the advantages above stated, it will be appreciated that the invention is susceptible to modification, variation and change without departing from the proper scope or fair meaning of the subjoined claims.

I claim:

1. A load spacer device comprising:
    a multicelled honeycombed collapsible load spacer;
    a support means for said load spacer comprising:
        a first generally vertical flange portion adapted to be secured to a vertical surface;
        a second generally horizontal flange portion spaced from said first flange portion adapted to be supported by a horizontal surface;
        a main body portion interconnecting said first vertical and second horizontal flange portions; and
        said main body portion being provided with a generally horizontal supporting flange portion secured to said load spacer so as to support said load spacer between opposing spaced apart vertical surfaces.

2. A load spacer device as set forth in claim 1 wherein said first vertical flange portion has means provided thereon for securing it to said vertical surface.

3. A load spacer device as set forth in claim 2 wherein said means is a strip of pressure sensitive adhesive.

4. A load spacer device as set forth in claim 1 wherein said support means is fabricated from a sheet of foldable material.

5. A load spacer device as set forth in claim 4 wherein said foldable material is corrugated fiberboard.

6. A load spacer device as set forth in claim 1 wherein said load spacer is collapsible and said support means is adapted to be folded into a compact package.

7. A load spacer device as set forth in claim 1 wherein said flange portions are formed by providing lateral score lines on said sheet and folding said sheet therealong.

8. A load spacer device as set forth in claim 1 wherein said first vertical flange portion is formed by providing a pair of transverse parallel score lines on one side of said sheet, said second horizontal flange portion is formed by providing a transverse score line on another side of said sheet and said horizontal supporting flange portion is formed by providing a transverse score line on said another side and a pair of transverse score lines on said one side.

9. A collapsible load spacer device and support means adapted to be installed between a stack of freight and an adjacent vertical surface comprising:

a collapsible honeycomb multicelled load spacer;

a sheet of foldable material;

a first pair of slightly spaced apart substantially parallel transverse score lines on one side of said sheet adjacent one end thereof adapted to allow said sheet to be folded therealong to form a first generally vertical flange portion adapted to be attached to a vertical surface;

a second pair of slightly spaced apart substantially parallel transverse score lines disposed on said one side of said sheet and spaced apart from said first pair of score lines;

an intermediate transverse score line disposed on another side of said sheet between said first and second pairs of score lines and adapted to cooperate therewith to form a supporting generally horizontal flange portion after folding;

another transverse score line on said another side of said sheet and adjacent another end of said sheet adapted to allow said another end portion of said sheet to be folded therealong to form a second generally horizontal flange portion adapted to be supported by a horizontal surface; and said load spacer being secured to said supporting horizontal flange portion on said one side of said sheet so as to be supported between opposing spaced apart vertical surfaces.

10. A load spacer device as set forth in claim 9 wherein said first vertical flange has a pressure sensitive adhesive coating on said another side thereof and said second horizontal flange portion is adapted to be inserted between parcels of said stack of freight.

* * * * *